(12) United States Patent
MacMillian et al.

(10) Patent No.: US 8,594,899 B2
(45) Date of Patent: Nov. 26, 2013

(54) CLUTCH RUN-IN BY SLIP CONTROL

(75) Inventors: Loyal George MacMillian, Karlsruhe (DE); Ekkehard Reibold, Lahr (DE); Georg Göppert, Hausach (DE); George Herr, Canton, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/415,100

(22) Filed: Mar. 8, 2012

(65) Prior Publication Data
US 2012/0232767 A1 Sep. 13, 2012

Related U.S. Application Data

(60) Provisional application No. 61/451,965, filed on Mar. 11, 2011.

(51) Int. Cl.
*G06F 7/00* (2006.01)
(52) U.S. Cl.
USPC .......................... 701/67; 192/82 T; 477/176
(58) Field of Classification Search
USPC .................. 701/67; 192/82 T, 82 R; 477/176
See application file for complete search history.

(56) References Cited

U.S. PATENT DOCUMENTS

| | | | | |
|---|---|---|---|---|
| 5,643,136 | A * | 7/1997 | Kono et al. | 477/169 |
| 5,916,852 | A * | 6/1999 | Nibert et al. | 508/432 |
| 6,024,674 | A * | 2/2000 | Sato et al. | 477/175 |
| 2004/0260444 | A1 * | 12/2004 | Winkelmann et al. | 701/67 |
| 2008/0234106 | A1 * | 9/2008 | Maguire et al. | 477/169 |
| 2010/0063693 | A1 * | 3/2010 | Lee et al. | 701/54 |
| 2010/0185373 | A1 * | 7/2010 | Herter et al. | 701/67 |
| 2012/0115681 | A1 * | 5/2012 | Reuschel et al. | 477/174 |
| 2012/0316033 | A1 * | 12/2012 | Jung et al. | 477/181 |

FOREIGN PATENT DOCUMENTS

WO WO2011009426 1/2011

* cited by examiner

*Primary Examiner* — Helal A Algahaim
(74) *Attorney, Agent, or Firm* — Kevin L. Parks

(57) ABSTRACT

A method for operating a clutch includes operating the clutch with increased slip during a green phase and operating the clutch with normal slip during a post-green phase. In some example embodiments, increased slip consists of slip speeds greater than 40 revolutions per minute. In an example embodiment, increased slip consists of a slip speed of approximately 50 revolutions per minute.

11 Claims, 2 Drawing Sheets

CLUTCH RUN-IN BY SLIP CONTROL

FIELD

The invention relates generally to an automated clutch system, and more specifically to a clutch run-in by slip control.

BACKGROUND

Automated clutches are known. One type of automated clutch is used in double clutch or powershift vehicle transmissions. When a new clutch is installed in a vehicle, the clutch is operated in a new, or green, phase. It may require a run-in or break-in period before it exits the green phase and performs optimally. Known operating strategies may include a costly "conditioning" of the clutch to bypass the green phase and ensure that torque capacity and controllability are met in the new condition, or may operate the clutch in the green phase and allow the clutch to naturally run-in over the course of the first miles, risking a possible reduction in clutch torque capacity and potential impacts to vehicle comfort.

Natural clutch run-in can lead to reduced customer acceptance and eventual complaints and/or lack of sales. For example, the clutch may have limited functionality during the green phase, leading to reduced torque capacity, variable system characteristics and potential noise, vibration, and harshness (NVH) problems (i.e., clutch judder) in a new vehicle.

BRIEF SUMMARY

Example aspects broadly comprise a method for operating a clutch including operating the clutch with increased slip during a green phase and operating the clutch with normal slip during a post-green phase. In some example embodiments, increased slip consists of slip speeds greater than 40 revolutions per minute. In an example embodiment, increased slip consists of a slip speed of approximately 50 revolutions per minute.

In an example embodiment, the method includes sensing or calculating the temperature of the clutch and reducing or eliminating the increased slip when the clutch temperature exceeds a predetermined limit. In an example embodiment, the method includes sensing the rotational speed of the clutch and reducing or eliminating the increased slip when the rotational speed exceeds a predetermined limit.

In some example embodiments, the method includes calculating the total energy input into the clutch and changing from the green phase to a post-green phase after a predetermined energy limit is reached. In an example embodiment, the predetermined energy limit is approximately 10 megajoules.

Other example aspects broadly comprise a clutch control system for a vehicle including an engageable clutch for connecting a prime mover to a transmission, a first sensor for measuring a rotational output speed of the prime mover, a second sensor for measuring a rotational input speed of the transmission, and a processor for adjusting the clutch engagement. The processor is connected to the first sensor and the second sensor, the processor adjusts the clutch engagement based on information from the first sensor and the second sensor, and the processor is configured to adjust the clutch to increase a clutch slip speed between the rotational output speed of the prime mover and the rotational input speed of the transmission during a green phase.

In an example embodiment, the system includes a temperature sensor for measuring a temperature of the clutch. The temperature sensor is connected to the processor and the processor is configured to adjust the clutch to reduce or eliminate the clutch slip speed when the temperature of the clutch exceeds a predetermined limit. In an example embodiment, the processor is configured to adjust the clutch to reduce or eliminate the clutch slip speed when the rotational output speed of the prime mover or the rotational input speed of the transmission exceeds a predetermined limit. In an example embodiment, the processor is configured to calculate a total energy input into the clutch, and the system exits the green phase after the total energy input exceeds a predetermined limit.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

The inventors have determined that the required time or mileage to run-in a new clutch is dependent on energy. The mileage can be reduced by increasing energy to the clutch during normal driving conditions by utilizing slip control to add clutch slip during steady-state driving. For example, a clutch slip speed of fifty (50) revolutions per minute may be introduced when the vehicle is cruising on an interstate and the clutch would normally have no slip. As clutch energy is a product of the transmitted torque and the slip speed, a slip speed of 50 RPM would increase the energy input into the clutch to shorten the run-in mileage.

Figure 1:
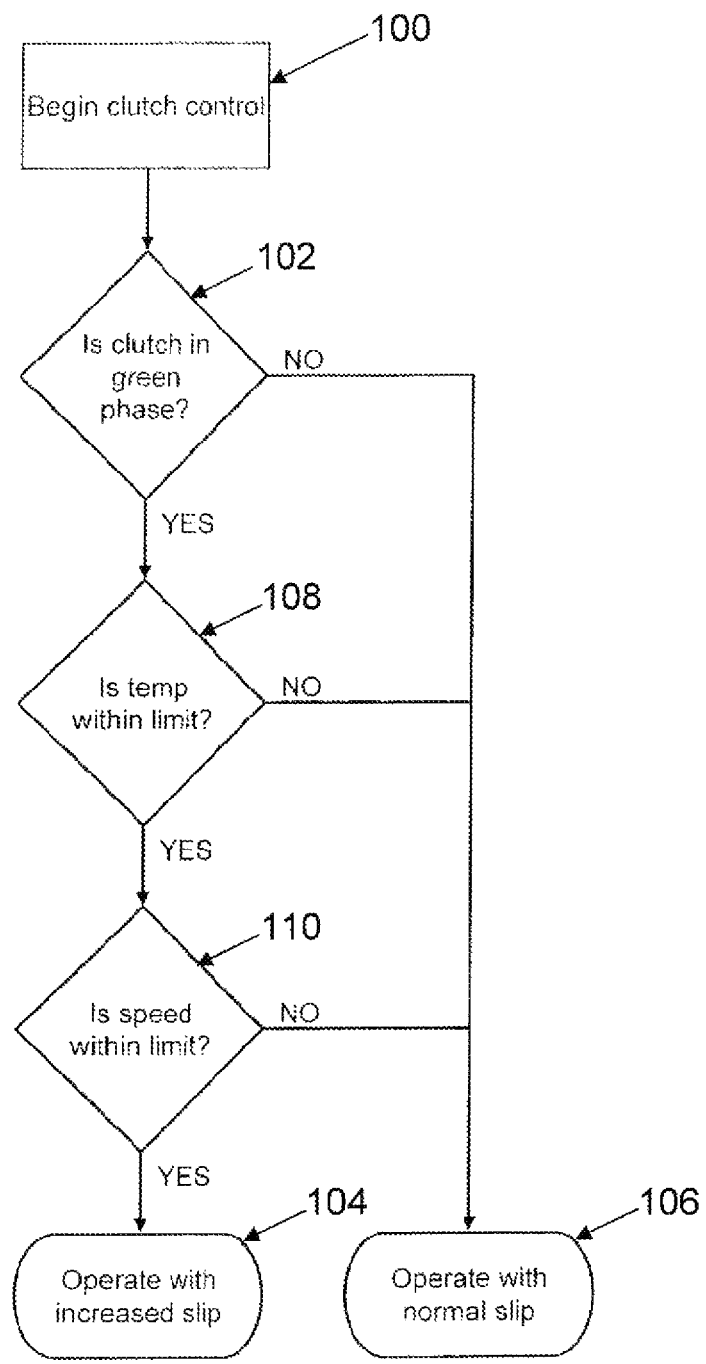
FIG. 1 is a flowchart showing an example method of operating a clutch with slip; and, FIG. 2 is a schematic of an example embodiment of a clutch control system.

FIG. 1 is a flowchart showing an example method of operating a clutch with slip. The following description is made with reference to FIG. 1. The method begins with box 100. In selection box 102, the method determines whether the clutch is operating in a green phase. If the clutch is in the green phase, the method continues towards increased slip box 104, but if not, the method exits to normal slip box 106. That is, the method includes operating the clutch with increased slip during a green phase and operating the clutch with normal slip during a post-green phase. In an example embodiment, increased slip consists of slip speeds greater than 40 revolutions per minute. In an example embodiment, increased slip consists of a slip speed of approximately 50 revolutions per minute.

Selection box 108 determines whether the clutch is within a temperature limit. That is, the method includes sensing the temperature of the clutch and reducing or eliminating the increased slip when the clutch temperature exceeds a predetermined limit. Otherwise stated, the clutch is operated with normal slip when the temperature exceeds the limit.

Selection box 110 determines whether the clutch is within a speed limit. That is, the method includes sensing the rotational speed of the clutch and reducing or eliminating the increased slip when the rotational speed exceeds a predetermined limit. Otherwise stated, the clutch is operated with normal slip when the speed exceeds the limit.

In an example embodiment, the energy input into the clutch is calculated to determine whether the clutch is operating in the green phase. That is, the method includes calculating the total energy input into the clutch and changing from the green phase to a post-green phase after a predetermined energy limit is reached. In an example embodiment, the predetermined energy limit is approximately 10 megajoules.

Figure 2:
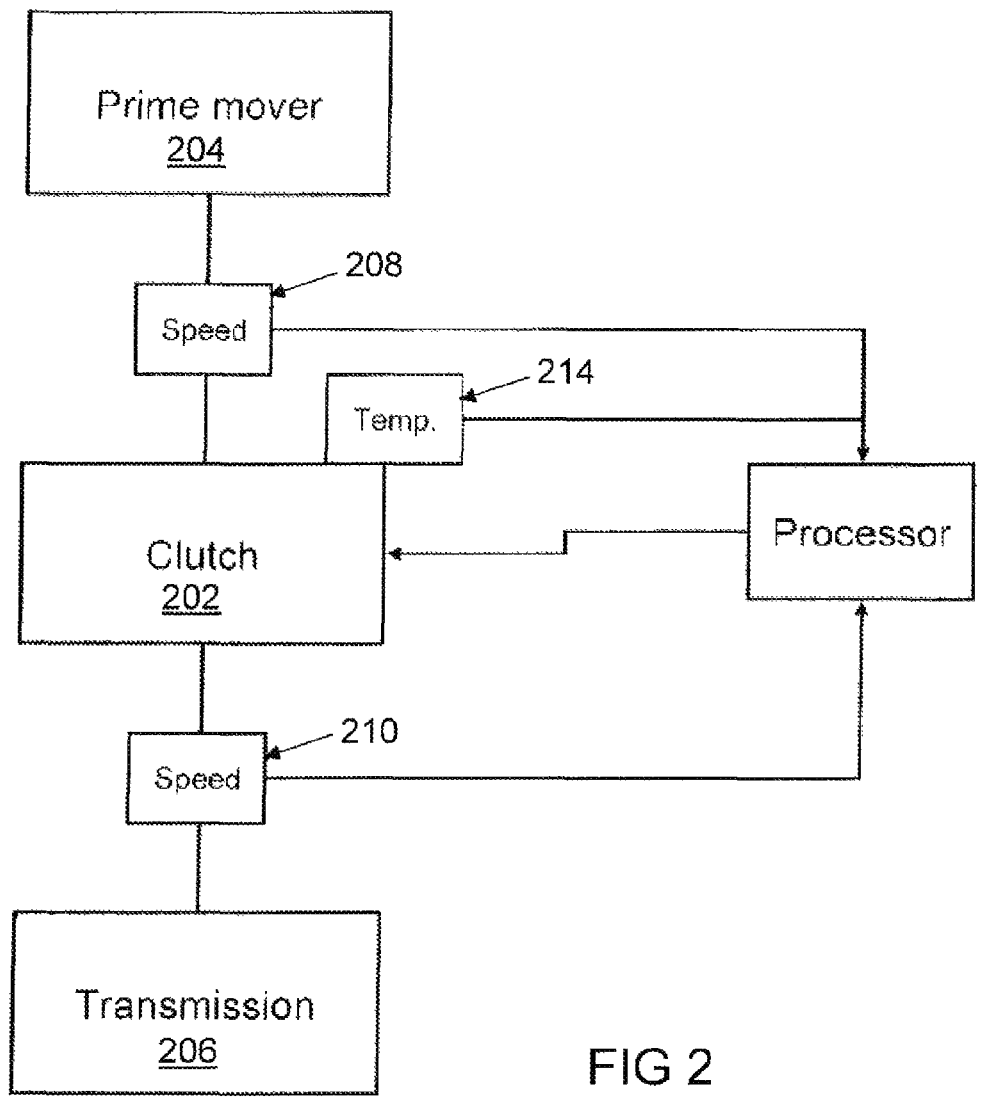

FIG. 2 is a schematic of an example embodiment of a clutch control system. The following description is made with reference to FIG. 2. Clutch control system 200 includes engageable clutch 202 for connecting prime mover 204 to transmission 206. Sensor 208 measures a rotational output speed of the prime mover and sensor 210 measures a rotational input speed of the transmission. Processor 212 is for adjusting the clutch engagement. Processor 212 is connected to sensors 208 and 210. Processor 212 adjusts the clutch engagement based on information from sensors 208 and 210. For example, processor 212 is configured to adjust clutch 202 to increase a clutch slip speed between the rotational output speed of prime mover 204 and the rotational input speed of transmission 206 during a green phase.

System 200 may include temperature sensor 214 for measuring a temperature of clutch 202. Temperature sensor 214 is connected to processor 212, and processor 212 is configured to adjust clutch 202 to reduce or eliminate the clutch slip speed when the temperature of clutch 202 exceeds a predetermined limit. In an alternative embodiment, clutch temperature is calculated based on energy input using a clutch temperature model. In an example embodiment, processor 212 is configured to adjust clutch 202 to reduce or eliminate the clutch slip speed when the rotational output speed of prime mover 204 or the rotational input speed of transmission 206 exceeds a predetermined limit. In an example embodiment, processor 212 is configured to calculate a total, or cumulative, energy input into clutch 202, and system 200 exits the green phase after the total energy input exceeds a predetermined limit.

In an example embodiment, the clutch operation is adjusted during the initial/normal usage of the clutch to increase slip to a low/mid level. For example, the clutch may be operated at 50 RPM slip instead of 0 RPM slip. Too much energy can damage the clutch, so the operation includes checks to verify that the energy input into the clutch is acceptable. For example, the system avoids additional slip when clutch temperatures are already high based on a temperature sensor or clutch temperature model. The system may also measure absolute speeds and avoid additional slip when the absolute speeds are high. Once the system exits the green phase, additional slip is discontinued so as to not reduce the clutch lifetime. The point at which the clutch exits the green phase may be known as the green flag and may be calculated based on the cumulative energy input into the clutch as recorded by an energy counter, for example.

Therefore, the described clutch control system successfully reduces customer exposure to unwanted characteristics (i.e., reduced torque capacity, variable system characteristics, and/or NVH problems) without increasing cost.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What we claim is:

1. A method for operating a clutch comprising:
   measuring a rotational output speed of a prime mover with a first sensor and a first computer processor;
   measuring a rotational input speed of a transmission with a second sensor and a second computer processor;
   sensing or calculating the temperature of the clutch using a third sensor and/or a third computer processor; and,
   calculating a clutch slip speed by subtracting the input speed from the output speed using a fourth computer processor;
   operating the clutch with a fifth computer processor to command the clutch slip speed to a first predetermined amount during a green phase;
   operating the clutch with the fifth computer processor to command the clutch slip speed to a second predetermined amount, lower than the first predetermined amount, during a post-green phase or when the clutch temperature exceeds a predetermined limit.

2. The method of claim 1, wherein the first predetermined amount consists of slip speeds greater than 40 revolutions per minute.

3. The method of claim 2, wherein the first predetermined amount consists of a slip speed of approximately 50 revolutions per minute.

4. The method of claim 1, further comprising:
   sensing the rotational speed of the clutch using a fourth sensor and a sixth computer processor; and,
   operating the clutch with the fifth computer processor to command the clutch speed to the second predetermined amount when the rotational speed exceeds a predetermined limit.

5. The method of claim 1, further comprising:
   calculating the total energy input into the clutch using a seventh computer processor; and,
   operating the clutch with the fifth computer processor to command the clutch speed to the second predetermined amount after a predetermined energy limit is reached.

6. The method of claim 5, wherein the predetermined energy limit is approximately 10 megajoules.

7. A clutch control system for a vehicle including:
   an engageable clutch for connecting a prime mover to a transmission;
   a first sensor for measuring a rotational output speed of the prime mover;
   a second sensor for measuring a rotational input speed of the transmission; and,
   a processor for adjusting the clutch engagement, wherein:
   the processor is connected to the first sensor and the second sensor;
   the processor adjusts the clutch engagement based on information from the first sensor and the second sensor; and, the processor is configured to adjust the clutch to increase a clutch slip speed between the rotational output speed of the prime mover and the rotational input speed of the transmission during a green phase.

8. The clutch control system of claim 7, further comprising a temperature sensor for measuring a temperature of the clutch, wherein the temperature sensor is connected to the processor, and the processor is configured to adjust the clutch to reduce or eliminate the clutch slip speed when the temperature of the clutch exceeds a predetermined limit.

9. The clutch control system of claim 7, wherein the processor is configured to adjust the clutch to reduce or eliminate the clutch slip speed when the rotational output speed of the prime mover or the rotational input speed of the transmission exceeds a predetermined limit.

10. The clutch control system of claim 7, wherein the processor is configured to calculate a total energy input into the clutch, and the system exits the green phase after the total energy input exceeds a predetermined limit.

11. The method of claim 1 wherein two or more of the computer processors are integrated into a single computer processor.

\* \* \* \* \*